Patented July 26, 1932

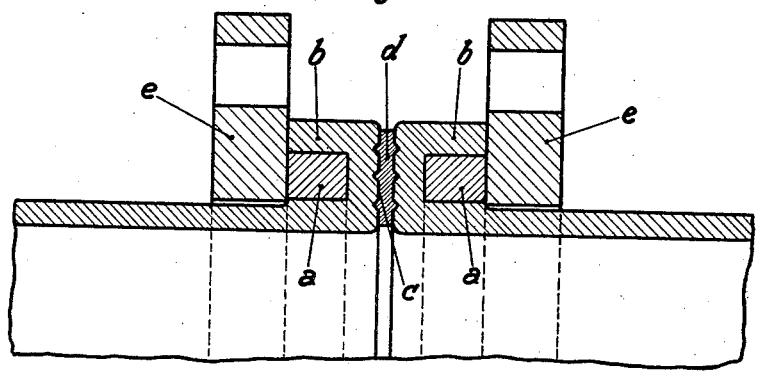
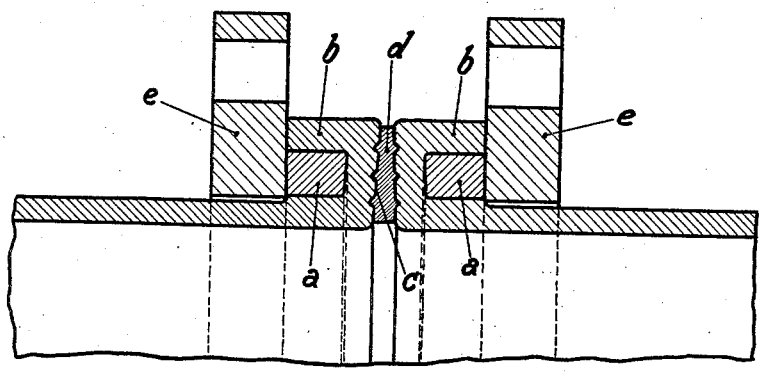
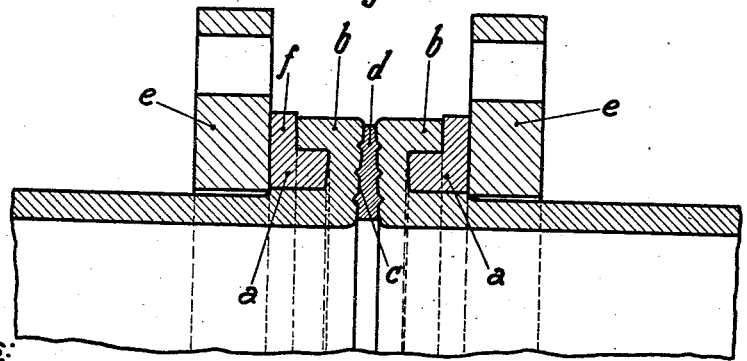

1,868,906

UNITED STATES PATENT OFFICE

JAKOB KEULERS, OF HILDEN, GERMANY

FLANGE PIPE CONNECTION

Application filed December 12, 1929, Serial No. 413,630, and in Germany May 16, 1928.

The flange pipe connections at present in use have almost without exception the disadvantage, that the fastening of the flange or collar on the pipe is not perfect and particularly with high pressures does not ensure a tightness of the connection.

In order to overcome this advantage, it has already been proposed, to bend over the projecting pipe end in U-shape onto a ring shrunk on the pipe, the collar formed thereby serving as rest for the flange. It has however been found, that this connection is also not satisfactory as at the bending over of the nonreinforced pipe end around the shrunk on reinforcement ring the wall strength is weakened at the points of bending in such a manner, that such connections are not capable of withstanding high stresses and therefore easily tear off at the points of bending. Consequently such connections are by no means suitable for high pressure conduits.

This invention relates to a pipe connection of the type last mentioned, in which however the defect referred to is overcome in that the thickness of the wall at the end of the pipe is reinforced by upsetting or the like before the beading over the shrunk on ring in such a manner, that no weakening occurs at the beading points with regard to the pipe wall, so that such connections are capable of withstanding the very high stresses which arise.

The invention further relates to a particularly advantageous construction of the packing surfaces proper. These packing surfaces of the U-shaped beading of the pipe are inclined to the pipe wall, and in the packing space thus formed, which has approximately a trapezoidal cross section, packing rings composed of soft metal of suitable trapeziform cross section are inserted.

Finally for the purpose of enlarging the bearing surface of the loose flange the metal ring applied to the pipe is provided with an annular projection against which the beaded pipe end bears.

Several embodiments of the invention are illustrated by way of example in the accompanying drawing in which:

Fig. 1 shows a form of construction, in which the pipe end is reinforced by upsetting or the like before the beading as far as necessary for the bending over the metal ring fitted on the pipe. By this means not only weakening at the bending points is avoided but also an enlarged bearing surface for the loose flange formed.

Fig. 2 shows a similar form of construction to that illustrated in Fig. 1 but with the difference, that in this construction the packing surfaces are inclined to the pipe wall, so as thereby to obtain an increased security against pressing out of the packing ring to be inserted in the packing screws.

Fig. 3 shows a similar construction to that illustrated in Fig. 2, only with the difference that in this construction a further enlargement of the bearing surface for the loose flange is formed by an annular extension of the metal ring fitted on the pipe.

In all the figures $a$ is the metal ring to be fitted on the pipe before the beading, around which the pipe end $b$ is bent in U-shape. $c$ are the packing surfaces proper and $d$ is the packing consisting of suitable material, for example soft metal, which is inserted in the packing space. $e$ are loose flanges, and $f$ designates the extension of the metal ring $a$ shown in Fig. 3.

I claim:

A flange connection for pipes comprising rings shrunk one on each pipe end a short distance behind the end of the pipe, and a portion of the pipe end projecting from the ring upset so that it is bent in U-shape around the corresponding ring, a loose flange on each pipe end bearing against the end of said upset U-shaped portion, the opposite surfaces of said U-shaped bent portions of the pipe ends inclined to the pipe wall forming between the abutting pipe ends a packing space of trapeziform cross section narrower towards the outer side, and a packing ring of corresponding trapeziform cross section in said packing space.

In testimony whereof I affix my signature.

JAKOB KEULERS.